United States Patent [19]

van der Graaf

[11] 4,220,381

[45] Sep. 2, 1980

[54] DRILL PIPE TELEMETERING SYSTEM WITH ELECTRODES EXPOSED TO MUD

[75] Inventor: Gerardus C. van der Graaf, Rijswijk, Netherlands

[73] Assignee: Shell Oil Company, Houston, Tex.

[21] Appl. No.: 28,487

[22] Filed: Apr. 9, 1979

[30] Foreign Application Priority Data

Apr. 7, 1978 [GB] United Kingdom ............... 13752/78

[51] Int. Cl.$^3$ ............................................. G01V 1/40

[52] U.S. Cl. ............................. 339/16 C; 339/16 RC; 339/147 R; 340/856

[58] Field of Search .................................... 339/15-16, 339/147 R; 340/853, 856-858

[56] References Cited

U.S. PATENT DOCUMENTS

| | | | |
|---|---|---|---|
| 2,096,359 | 10/1937 | Hawthorn | 340/857 |
| 2,178,931 | 11/1939 | Crites et al. | 339/16 R |
| 2,197,392 | 4/1940 | Hawthorn | 339/16 R |
| 2,531,120 | 11/1950 | Feaster | 339/16 R |
| 3,170,137 | 2/1965 | Brandt | 339/16 R |
| 3,253,245 | 5/1966 | Brandt | 339/16 R |
| 3,518,608 | 6/1970 | Papadopoulos | 339/16 C |
| 3,518,609 | 6/1970 | Fontenot, Jr. | 339/16 C |
| 3,662,223 | 5/1972 | Marshall | 339/147 R |
| 3,696,332 | 10/1972 | Dickson, Jr. et al. | 340/853 |
| 3,879,097 | 4/1975 | Oertle | 340/856 |
| 4,095,865 | 6/1978 | Denison et al. | 339/16 R |
| 4,121,193 | 10/1978 | Denison | 340/857 |
| 4,126,848 | 11/1978 | Denison | 340/857 |

*Primary Examiner*—John McQuade

[57] ABSTRACT

A drill string telemetry system of the hard-wired type wherein a separate conductor extends through each section of the drill pipe. The conductor is connected to connectors located in the ends of the drill pipe with the connectors completing the electrical circuit as the drill pipe is assembled. The connectors are designed to be exposed to the drilling fluid and include an amplifier.

7 Claims, 9 Drawing Figures

DRILL PIPE TELEMETERING SYSTEM WITH ELECTRODES EXPOSED TO MUD

BACKGROUND OF THE INVENTION

The present invention relates to a pipe section for use in a borehole, and in particular to a pipe section that can be applied in a pipe string having arranged therein an electric circuit that is adapted for telemetering purposes. Electric signals may be passed through such electric circuit, such signals either being representative for data that have been measured by measuring equipment situated in the borehole or well, or being command signals that are sent down the hole from the surface for controlling the operation of downhole tools.

A large number of telemetering systems that make use of an electric circuit is already known. Some of these systems apply a continuous conductor cable that extends through the bore of the pipe string from the surface to a downhole tool or measuring means. Other systems have a separate conductor cable arranged in each pipe section, said cable extending between electrical connectors situated at both ends of the pipe section in a manner such that when the pipe section is interconnected with identical pipe sections, the eletrical connectors are in metal-to-metal contact with each other, thereby electrically interconnecting the conductor cables in the sections.

The electrical connectors of these latter systems are all designed to exclude the drilling fluid from the metal-to-metal contact area in order to prevent short-circuits from being formed between the connectors and the metal bodies of the pipe sections. The contacting faces of the metal connectors should be smooth and flat, and should be thoroughly cleaned from any drilling fluid or particles such as drilling mud or grit that might get stuck between the metal connectors when the joint is made up, and apart from damaging the connector, will increase the effective contact resistance to an undesirable level, which will result in a weakening of the strength of the signal that has to pass these metal contact areas during its transmission through the electric circuit in the pipe string.

It will be appreciated that the cleaning action required to remove undesirable fluids and particles from the metal connectors is a time-consuming operation. Further, the design of the metal connector should be such that drilling fluids are prevented from entering the metal contact areas, and this requires careful machining and mounting of the connectors.

BRIEF SUMMARY OF THE INVENTION

It is therefore an object of the invention to provide a pipe section with telemetering means that do not require cleaning of the exposed electrical metal parts thereof prior to making up the joints of a pipe string consisting of such pipe sections.

It is a further object of the invention to provide a pipe section with telemetering means, which pipe section can be manufactured relatively easily and at relatively low cost.

The pipe section according to the invention has an inner wall defining a throughbore and terminating at the ends thereof with mechanical coupling means adapted for effecting detachable interconnection with adjoining identical pipe sections. The pipe section is provided with electrical transmission means comprising electrode means located near the ends of the section, with an insulated electrical conduit interconnecting said electrode means, and with an amplifier connected with said insulated electrical conduit. The electrode means are insulated with respect to the pipe section and are arranged to electrically cooperate with the electrode means of the adjoining identical pipe sections. In this interconnected position of adjoining pipe sections, the electrode means are situated in a space that communicates with the said throughbore or the exterior of the pipe sections.

It is observed that the electrode means of pipe sections according to the present invention will be in contact with borehole fluid such as drilling fluid, when a pipe string having these pipe sections included therein is used in a bore hole or well. The electric signals that should be passed between the sender-electrode and the receiver-electrode of each pair of electrically cooperating electrodes carried by adjoining sections will thereby partly leak away via the bore hole fluid to the metal bodies of the pipe sections, and only for part thereof be received by the receiver-electrode. The reduction in signal strength is compensated in each pipe section by the amplifier that is included in the electrical transmission means of the pipe section. Even when the sender-electrode and the receiver-electrode that cooperates electrically with the sender-electrode, are situated at a small distance from each other, the receiver-electrode will receive the electric signal that has traversed this distance through the borehole fluid that is present between the electrodes. It will be appreciated that since the present invention allows a pair of electrically cooperating electrodes to pass signals therebetween without a physical contact between the metal parts of the electrodes, the electrodes do not require to be cleaned prior to making up the joint between adjacent pipe sections, since the distance or gap present between the electrodes is sufficient to allow drilling mud or particles to stay on the electrode surfaces without being crushed when the electrode surfaces are being positioned in their operative position during making up of the joint.

The amplifier used in the pipe section of the present invention is of miniaturized design, and includes small-sized accumulators as an energy source. The amplifier is designed to have a low energy consumption. If desired, the part of the amplifier consuming most of the energy can automatically be switched "on" upon reception of any signal and can be switched "off" if signal ceases.

BRIEF DESCRIPTION OF THE DRAWINGS

The invention will now be described by way of example in more detail with reference to the embodiments shown in the drawings.

PREFERRED EMBODIMENTS

It will be appreciated that identical elements shown in the figures are indicated by identical reference numbers.

Figure 1:
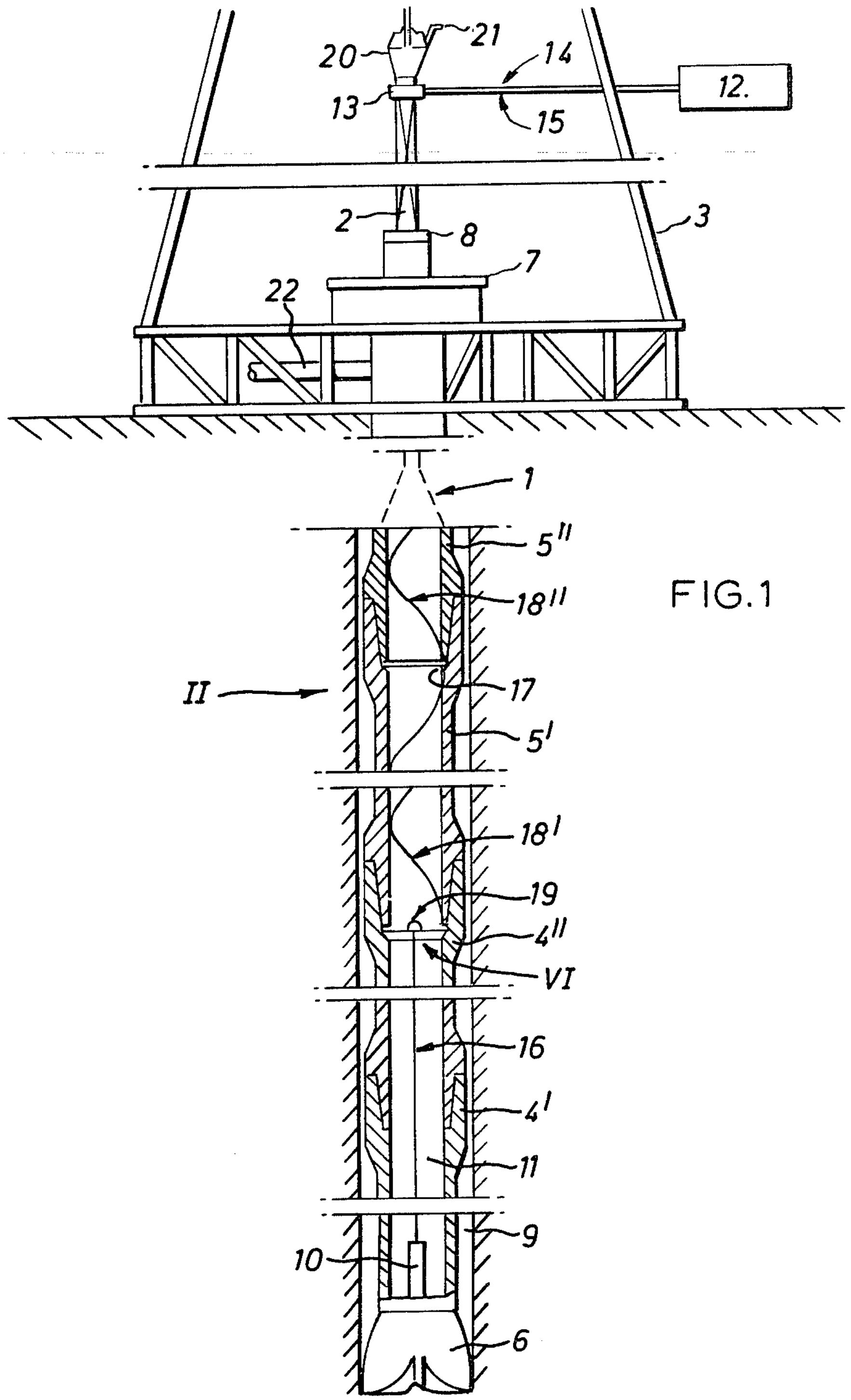
FIG. 1 shows schematically a longitudinal section over borehole drilling equipment comprising drill pipe sections according to the invention.

The rotary drilling equipment shown in FIG. 1 of the drawings comprises a drill pipe string according to the invention. The string 1 comprises a kelly 2, which is suspended in a conventional manner in a derrick 3 by means of hoisting means (not shown), and a plurality of drill pipes 4′, 4″, . . . 5′, 5″. . . . The pipes or pipe sections are connected together in an end-to-end relation by screw thread couplings. A drill bit 6 is attached to the lower end of the string 1.

The kelly 2 passes through a rotary table 7, which table carries a kelly bushing 8 coupling the kelly 2 to the rotary table 7. Further, means are provided for transmitting power from the rotary table 7 to the string 1 for rotating the string 1 and the bit 6 in the hole 9. A means 10 for measuring the inclination of the borehole 9 and generating an electric signal representative for the degree of this inclination is mounted close to the bit 6 in the throughbore 11 of the pipestring 1. A means 12 for recording the electric signal generated by means 10 is installed at the surface.

The means 10 and 12 are electrically interconnected for the transmission of electric signals therebetween by an electrical circuit extending through the throughbore 11 of the string 1 to a collector 13, which collector is provided with slip rings (not shown) for transmitting the electric signals from a rotary member to a stationary member. This type of electric collector is known and does not form part of the invention.

The stationary member of the collector 13 is electrically connected to the recorder 12 by a cable comprising the conductors 14 and 15. Conductor 15 is connected to ground, whereas conductor 14 is in electrical communication via the rotary member of the collector 13 with the electrical circuit passing through the string 1 to the means 10. This circuit consists of a continuous electric cable 16 extending through a number of pipe sections 4′, 4″, etc. of the pipe string, and of a plurality of electric transmission means (which will be described hereinafter in more detail) which electric transmission means are each arranged separately in each of the pipe sections 5′, 5″, etc. and in the kelly 2 of the drillstring 1.

Electrode means, represented generally as 17, form part of the electrical transmission means and are mounted near the ends of each of the pipe sections 5 for transmitting electric signals between these interconnected pipe sections. The electrode means 17 carried by one and the same pipe section are electrically interconnected by an insulated electrical conduit 18, which also forms part of the electrical transmission means of the pipe section.

The upper end of the continuous electric cable 16 is electrically connected to electrode means 19, which latter means cooperates with the lower electrode means of the pipe section arranged above that part of the pipe string which encloses the continuous cable 16. Reference is also made to the description of FIGS. 6 & 7 where the cooperating electrode means will be discussed in more detail.

The borehole 9 is drilled by axially loading and rotating the drill bit 6 and by pumping drilling fluid down through the string 1 and up the borehole annulus. The drilling fluid is delivered to swivel 20 through a hose (not shown) attached to hose connection 21 and is returned to the surface fluid system through pipe 22.

During drilling, the inclination of the hole at the level of the bit 6 is being measured by the means 10. The degree of the inclination measured is translated in electric signals that are passed on to the recorder 12 through the electric circuit consisting of the continuous cable 16 in the pipe sections 4′, 4″. . . etc. and the plurality of electric transmission means in the pipe sections 5′, 5″, . . . etc., the kelly 2, the collector 13 and the electric conductor 14. The means 10 for measuring the inclination of a borehole are known and do not require a detailed description thereof.

Figure 2:
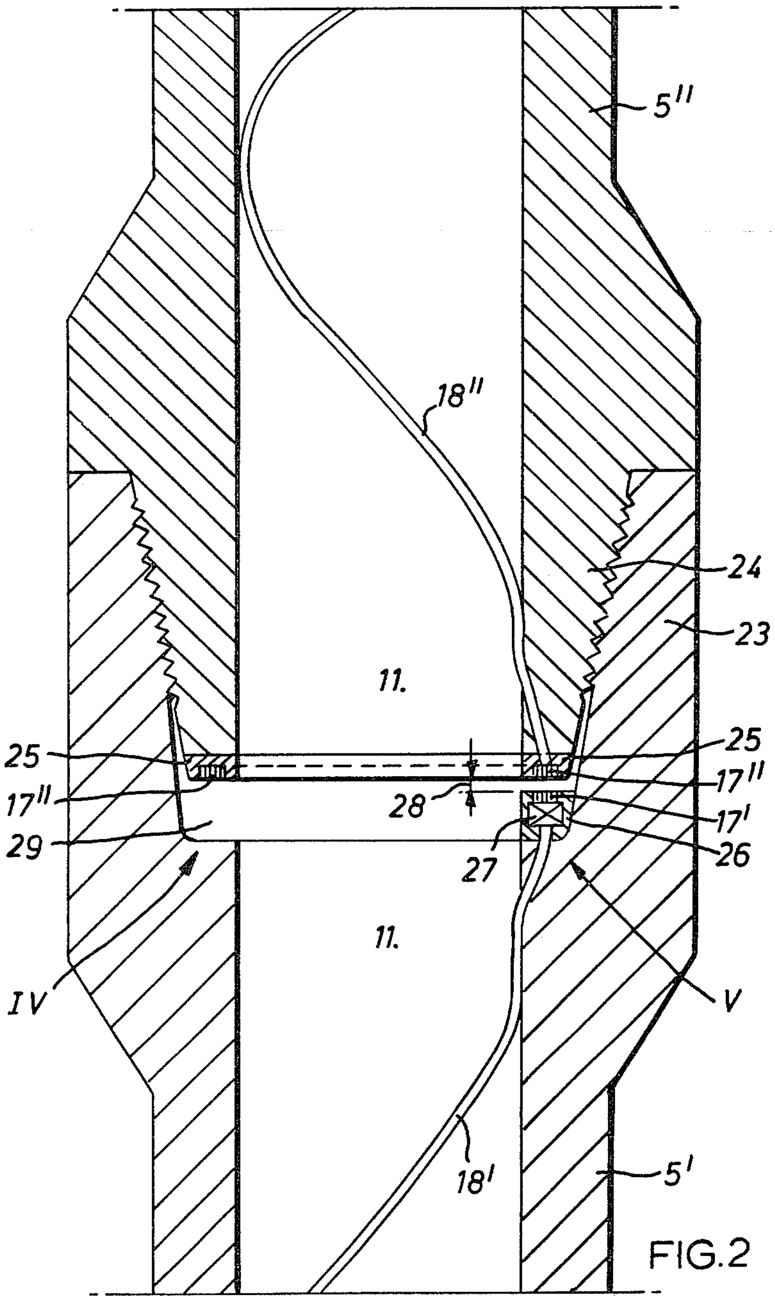
FIG. 2 shows detail II of FIG. 1 on a larger scale.

Reference is now made to FIG. 2 of the drawings which shows detail II of FIG. 1 on a larger scale. FIG. 2 shows a longitudinal section over the cooperating coupling means of adjacent pipe sections 5′ and 5″, that are both equipped with an electrical transmission means. The pipe sections are identical and each of these sections is provided with a box end and a pin end. Box end 23 of pipe section 5′ cooperates with the pin end 24 of pipe section 5″.

Each pipe section supports, as has been observed already hereinabove with reference to FIG. 1, an electrode near each end thereof, which electrodes are electrically connected by an insulated electric conduit. These insulated electric conduits 18′, 18″ are helically curved in the manner shown in the drawing. By this arrangement, a passage is kept free in the throughbore 11 of each pipe section, this passage allowing tools to be lowered through the drill string. Further, by choosing the outer diameter of the curves of the electric conduit larger than the inner diameter of the throughbore of the pipe section in which it is arranged, the electric conduit will be pressed against the inner wall of the pipe section and will maintain this position even when mud is flowing through the drill string and/or the drill string is being bent in a curved borehole.

Electric signals are being passed between the electric conduits 18′ and 18″ of the pipe sections 5′ and 5″, respectively, through the intermediary of the electrodes 17′ and 17″. The electrode 17″ consists of a metal ring carried by an insulating layer 25 that is attached to the lower end of the pipe section 5″. The electrode 17″ is electrically connected to the electric conduit 18″ but insulated from the metal body of the pipe section 5″.

The electrode 17′ is carried by the box end 23 of the pipe section 5′ by means of a body 26 formed of insulating material, and is electrically connected to the lead of the electric conduit 18′ through the intermediary of the amplifier 27 which is adapted for amplifying electric signals that are being passed through the electric circuit in the drill string. The amplifier 27 is arranged inside the body 26 and insulated with respect to the metal pipe section 5′ and the mud flowing through the throughbore of this pipe section.

It will be appreciated that whereas electrode 17″ is ring-shaped and electrode 17′ consists of a plate of small dimensions, the electrodes will face one another in any position of the pin end 24 and the box end 23 when screwed together. In the coupled position of the box end 23 of the pipe section 5′ and the pin end 24 of the pipe section 5″, a gap 28 exists between the electrodes 17′ and 17″. The mud in this gap, which mud fills the annular space 29 formed between the lower end of the pin end 24 and the bottom plane of the interior of the box 23, is in contact with both electrodes 17′ and 17″, thereby forming a passage between these electrodes for electric signals that are being passed through the electrical circuit in the drill string.

It will be appreciated that the conductivity of the drilling mud on the one hand allows the passage of such signals between electrodes facing one another, but on the other hand also allows these signals to pass to the metal bodies of the pipe sections 5′ and 5″. It has, however, been found that—provided the gap 28 is not too wide—at least part of the energy of the signals that are relayed by the electrode 17′ will be received by the electrode 17″. The remaining part of the energy is lost by leaking away to the grounded metal bodies of the pipe sections 5′ and 5″. It will be understood that a signal that should pass along the electric circuit in the string and thereby pass a plurality of such gaps 28 at each coupling between pipe sections 5 carrying electric conduits 18, will be intolerably weakened and finally die out before reaching the recorder means 12 (see FIG. 1) at the surface. The signals are thereto amplified at least once by an amplifier 27 when travelling along a pipe section. This amplifier is self-contained, which means that it is provided with a private energy source such as one or more batteries (not shown). Since the energy-requirement for amplifying the signals is very small, the batteries may be of extremely small size, and can easily be housed in the body 26. If required, the annular space 29 may be used for housing the required amount of batteries.

Figure 3:
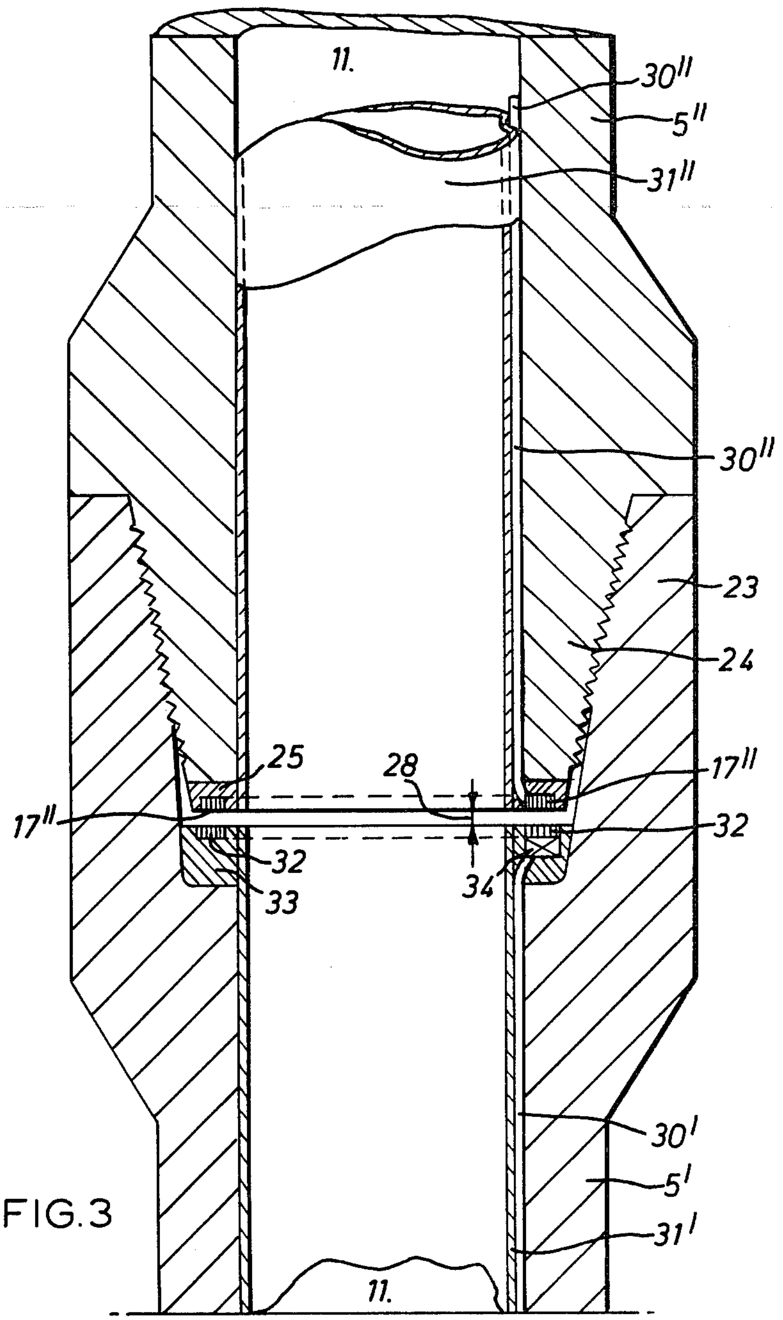
FIG. 3 shows an alternative of the coupling shown in FIG. 2.

Reference is now made to FIG. 3 of the drawings, which shows an alternative of the coupling means of FIG. 2. In the embodiment shown in FIG. 3 substantial straight insulated electric conduits 30′, 30″ extend between the electrodes situated at each end of the pipe sections 5′ and 5″, respectively. Tubular elements 31′, 31″ press the conduits 30′ and 30″ against the inner wall of the pipe sections 5′ and 5″, respectively. The electric conduit is thereby kept in position against the inner wall of the pipe section and a passage for tools is kept free in the throughbore 11 of this pipe section. The inner wall of the pipe sections is protected against damage caused by tools and corrosion by using tubular elements 31′, 31″ of suitable material, such as aluminum or a suitable plastic composition.

The electrode 17″ is carried by an annular insulating body 25 that is attached to the lower end of the pipe section 5″, and is ring-shaped in the same manner as in the embodiment shown in FIG. 2. In the embodiment shown in FIG. 3 the electrode 32 is likewise ring-shaped and is carried by the upper end of the pipe section 5′ by means of an annular body 33, formed of insulating material. An amplifier 34, which electrically connects the electrode 32 to the electric conduit 30′, is arranged inside the body 33 of insulating material and is insulated with respect to the metal pipe section 5′ and the mud flowing through the throughbore of the pipe section. The annular insulating bodies 25 and 33 are glued to the pipe sections 5″ and 5′, respectively, or connected thereto in any other suitable manner.

Figures 4, 5:
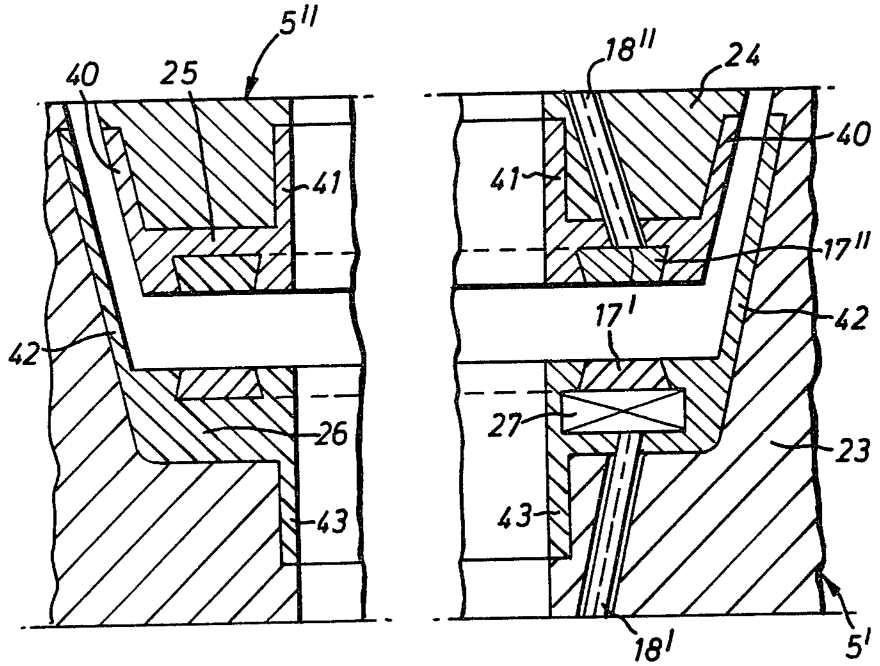
FIGS. 4 and 5 show alternatives of the details IV and V of FIG. 2, respectively, on a larger scale.

FIGS. 4 and 5 show alternatives of the details IV and V of the electrode arrangement of the pipe-section coupling of FIG. 2. These details are on a scale larger than the scale of FIG. 2.

As already mentioned, part of the energy of the signals that pass between the electrodes at the ends of the pipe sections is lost by leadking away to the grounded metal bodies of the pipe sections. To avoid that a signal passing along the electrical circuit in the drill string would be intolerably weakened and finally die out before reaching the recorder means 12 (see FIG. 1) at the surface, the signals are amplified by suitable amplifying equipment at least once when travelling through the electrical transmission means of each section. Further, weakening of the signal may be obviated by covering particular parts of the interior of the pipe sections with layers of insulating material. Such layers are shown in FIGS. 4 and 5. These layers are formed by cylindrical extensions 40, 41 of the annular electrode 17″. Furhter cylindrical extensions 42, 43 are attached to the annular body 26 of insulating material, which body carries the annular electrode 17′ and the amplifier 27. It will be appreciated that these layers form a barrier between the electrodes 17″, 17′ and those parts of the metal bodies of the pipe sections 5′ and 5″ in the immediate neighborhood thereof. This barrier decreases leakage of the signal energy to the grounded metal pipe section and consequently improves the transfer of signals.

The extensions 40, 41 and 42, 43 are located in annular grooves of the pipe sections 5′ and 5″ and may be attached thereto by means of a suitable glue.

Figure 6:
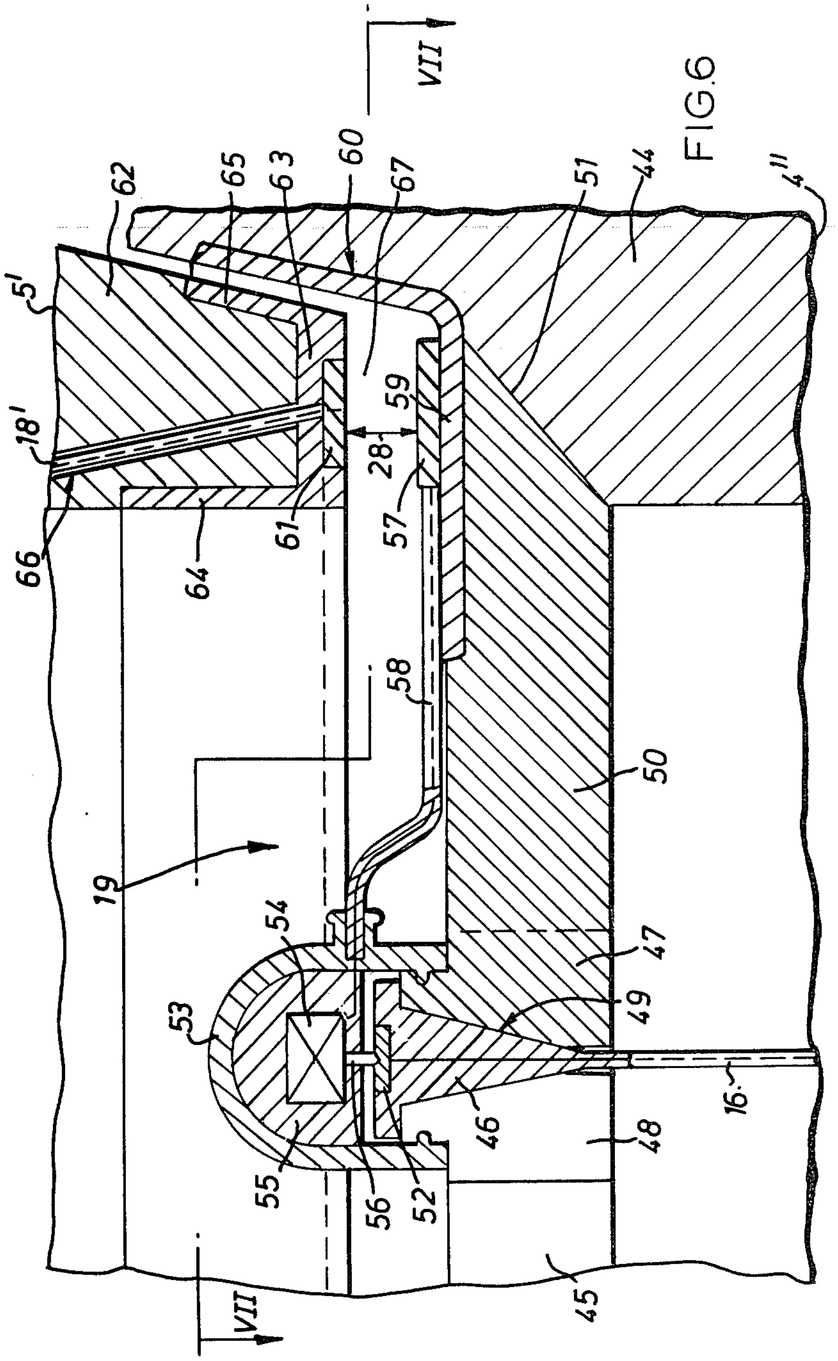
FIG. 6 shows detail VI of FIG. 1 on a larger scale.
Figure 7:
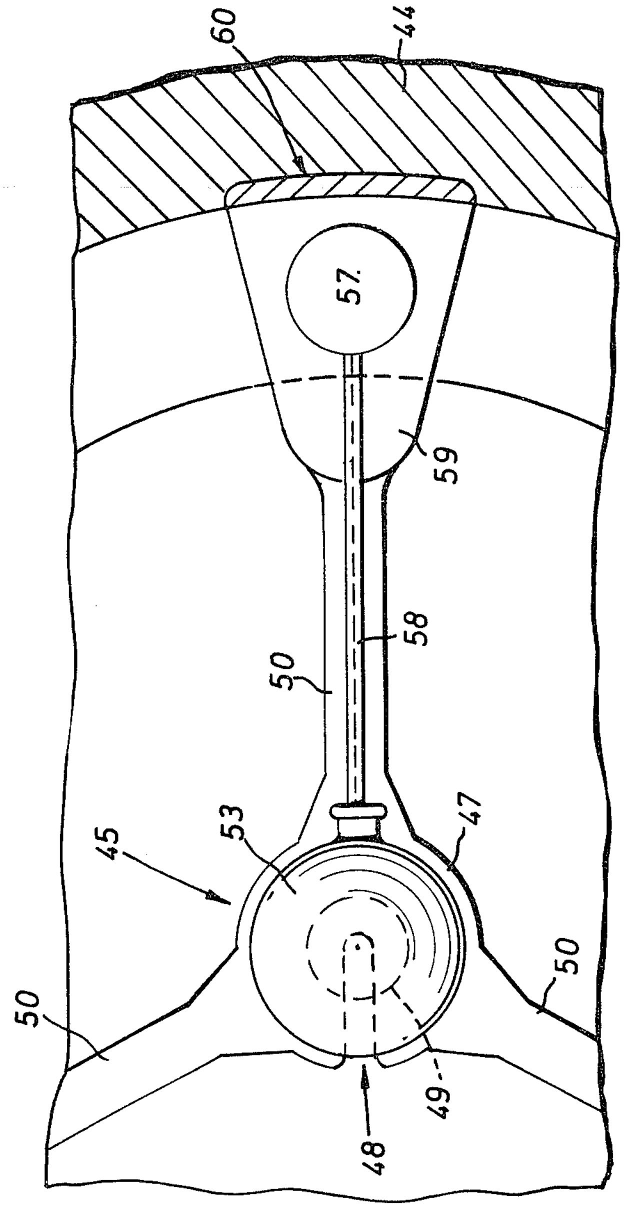
FIG. 7 shows cross-section VII—VII of the detail shown in FIG. 6.

Reference is now made to FIGS. 6 and 7 of the drawings. FIG. 6 shows detail VI of FIG. 1 on a larger scale and FIG. 7 is a cross-section of the coupling of FIG. 6 along the line VII—VII.

Pipe section 4″ is provided with a box end 44, in which a spider 45 is located, which spider supports the continuous electric cable 16 at the upper end 46 thereof. The spider 45 comprises a central body 47 with vertical slit 48 ending in a conical passage 49 adapted for supporting the upper end 46 of the cable 16. The radial arms 50 of the spider 45 rest at the ends thereof on the conical bottom part 51 of the box 44. The upper end 46 of the continuous cable 16 has an electrode 52 arranged thereon, which electrode is electrically connected with the lead of the cable 16.

The upper end 46 of the cable 16 is conically shaped and the cable is supported by the spider 45 by passing the cylindrical part of the cable through the slit 48 of the of the central body 47 of the spider. Thereafter, the cap 53 of resilient material is clamped on the top of the central body 47. The cap 53 houses an amplifier 54 and batteries (not shown) of small size that are enclosed by a body 55 of insulating material. The metal pin 56 is at one end thereof connected to the electric input of the amplifier 54, and is pressed with the other end thereof onto the electrode 52 when the cap 53 is clamped in the body 47. The electric output of the amplifier is electrically connected to the electrode 57 by means of the insulated electric conduit 58. The electrode 57 is glued to a screen 59 of insulating material, which screen is glued to the end of one of the arms 50 of the spider 45. That part of the screen 59 that extends substantially vertically rests in a cavity 60 of the box 44. This part of the screen can be lifted from this cavity when the spider 45 is to be removed from the box 44.

An annular electrode 61 is arranged at the lower end of the pin end 62 of the pipe section 5′ that is screwed on top of the pipe section 4″ as shown in FIG. 1. The annular electrode 61 is embedded in a body 63 of insulating material, said body comprising two annular screens 64, 65 that extend along part of the inner wall and along part of the outer wall of the pin 62. The body 63 is connected to the pin 62 by gluing. An electric conduit 18′ extends through a passage 66 in the pin 62 and has one end of its lead electrically connected to the electrode 61. The other end of the conduit 18' is electrically connected (through the intermediary of an amplifier) with an electrode carried by the box end of the pipe section 5'. The amplifier and the electrode may be formed by the amplifier 27 and the electrode 17', respectively, as shown in FIG. 2 of the drawings.

When the pin end 62 of the pipe section 5' has been coupled to the box end 44 of the pipe section 4', a gap 67 exists between the annular electrode 61 and the circular electrode 57. This gap is filled with drilling mud having electric conductive properties. As a result thereof, any signals that are being passed on upwards through the cable 16, to the electrode 57 via the electrode 52, the pin 56, the amplifier 54 and the cable 58, are relayed to the annular electrode 61 thereby passing through the body of mud present in the gap 67. Leakage of part of the signals to the metal bodies of the pipe sections 4" and 5' is suppressed by the presence of the insulating screens 59, 64 and 65. However, such reduction in signal strength cannot be fully prevented, and counter measures are taken by the use of amplifying equipment, such as amplifier 54, to maintain the signal sufficiently strong to allow the signals to be transferred over the gap 67 over the distance 28.

Figure 8:
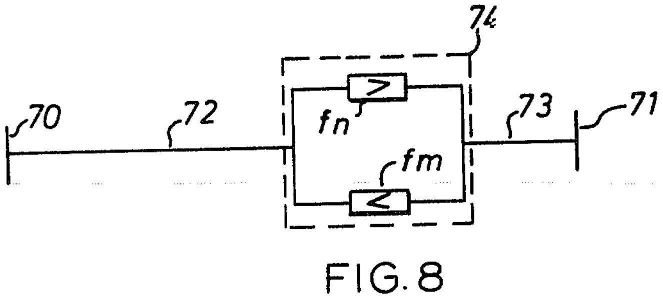
FIG. 8 shows the scheme of an electrical transmission means of a pipe section according to the invention.

It will be appreciated that although in the embodiments described up till now all the signals are travelling upwards from a measuring apparatus situated at a low level in the hole to the surface, such signals may also be passed in a reverse direction and be sent downwards to tools that should perform certain operations when situated at a low level in the borehole. In the latter case, the amplifiers should be adapted to amplify in the reverse direction. Sometimes, it may be required to send signals downwards as well as upwards in the hole. In such case, the electric transmission means in each pipe section 5, 5', . . . etc. may be designed as schematically shown in FIG. 8 of the drawings. In this electric transmission means, the electric signals can be passed between the electrodes 70 and 71 through electric conduits 72 and 73 and an amplifier 74. The electrodes 70, 71 are arranged at opposite ends of the pipe section for cooperation with corresponding electrodes of adjacent pipe sections when these sections have been screwed into end-to-end relationship.

The amplifier 74 is adapted for amplifying signals in two opposite directions. The amplifier is of miniaturized design, and since being known per se does not require a detailed description. The direction of the signals and thus the amplifying direction of the amplifier may be determined by coding the upward and downward signals in different ways, e.g., different frequencies ($f_m$; $f_n$) or pulses with different lengths. The amplifier may be installed at any location of the electrical path between the electrodes 70 and 71, but is preferably situated close to one of these electrodes. It will be appreciated that the electric conduits 72 and 73 consist of single lead conduits. It will be appreciated that in case the drill string is used in combination with the continuous cable 16, the amplifier 54 (see FIG. 6) should also be a two-way amplifier.

The distance 28 that should be present between cooperating electrodes in the arrangements of FIGS. 2–6 should preferably not be chosen too large, since the strength of the signals that have to be transmitted between the electrodes might otherwise be reduced to an undesired degree. On the other hand, this distance should not be too small, as this might cause damage of the electrodes when small grit-like particles are caught between the electrodes when making up the joint between the pipe sections carrying the electrodes. A distance 28 between 1 and 10 millimeters will give good results in the majority of cases. Transmission of low-strength signals may be improved by applying a smaller range of distances, say between 1 and 5 millimeters.

In the embodiments shown in the FIGS. 1 to 5, the electrodes being part of the electrical transmission means of a pipe section are in contact with the drilling mud passing through the interior of the pipe sections. The same effect as explained in the description of the FIGS. 1 and 2 can be obtained when the electrodes are installed in such a manner that they are in contact with the drilling mud passing along the outer wall of the pipe sections, when carrying out drilling operations by means of the drill string 1.

Figure 9:
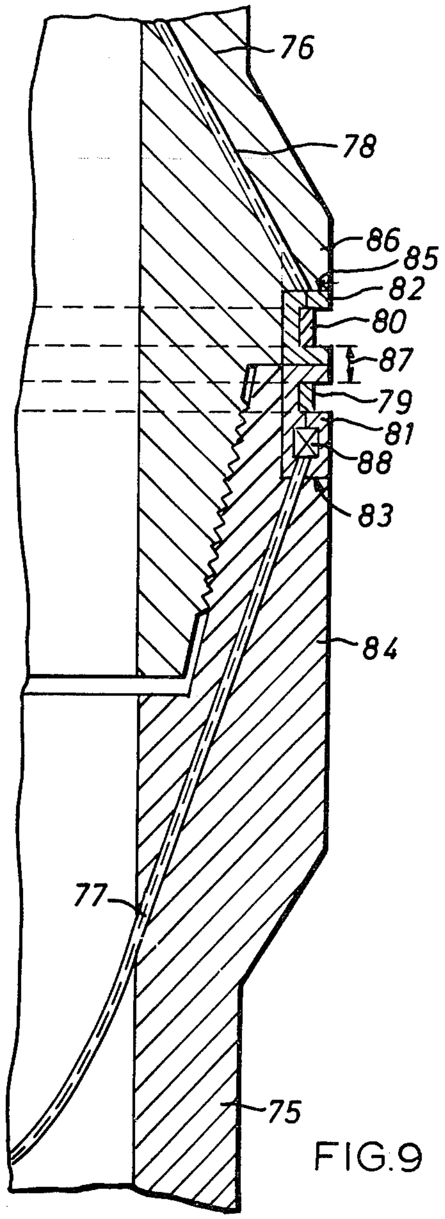
FIG. 9 shows schematically a longitudinal section over one half of a coupling between drill pipe sections, which coupling is another embodiment of the invention.

Reference is now made to FIG. 9, which shows a longitudinal section over one half of the cooperating coupling means of pipe sections 75 and 76, which sections are both equipped with electrical transmission means. Each pipe section supports an electrode near each end thereof, which electrodes are electrically connected by an insulated electric conduit. Electric signals can be passed between the insulated electric conduits 77 and 78 of the pipe sections 75 and 76, respectively, through the intermediary of the electrodes 79 and 80. Each of the electrodes 79 and 80 consists of a metal ring, insulated with respect to the metal pipe sections 75 and 76, respectively, by means of annular bodies 81 and 82 respectively, of insulating material. The body 81 is installed in an annular recess 83 in the outer wall of the box end 84 of pipe section 75, whereas the body 82 is installed in an annular recess 85 in the outer wall of the pin end 86 of pipe section 76. The bodies 81 and 82 are glued to the pipe sections 75 and 76, respectively, or connected thereto in any other suitable manner. In the coupled position of the box end 84 of the pipe section 75 and the pin end 86 of the pipe section 76, a gap 87 exists between the electrodes 79 and 80. The mud which passes along the outer wall of the pipe sections 75 and 76 is in contact with both electrodes 79 and 80, thereby forming a passage between these electrodes for electric signals that are being passed through the electric conduits 77 and 78.

An amplifier 88, which electrically connects the electrode 79 to the electric conduit 77, is arranged inside the body 81 of insulating material in such a manner that the amplifier 88 is insulated with respect to the metal pipe section 75 and the mud passing along the outer wall of this pipe section.

It is observed that the arrangement of the electrodes shown in FIG. 9, may also be placed inside the pipe sections 75 and 76 whereby the electrodes will be in contact with the mud passing through the interior of the pipe sections 75 and 76.

If desired, one of the ringshaped electrodes 79, 80 may be replaced by an electrode consisting of a plate of small dimensions, which electrode is arranged in the wall of the pipe sections 75, 76 respectively, and insulated from said wall.

The electric signals that may be passed through the electric transmission means of the present invention may be of any type. Best results, however, may be obtained by using signal pulses that carry the data to be transmitted from the bottom of the hole to the surface (or vice versa) in predetermined code.

What we claim is:

1. A pipe section for use in rotary drilling a borehole while circulating a drilling fluid, said pipe section terminating at opposite ends with mechanical coupling means adapted for effecting detachable interconnection with adjoining identical pipe sections, the improvement comprising:

an electrical conductor extending through said pipe section, an electrode means disposed near the ends of said pipe section, said electrode means being coupled to said electrical conductor and insulated from said pipe section, said electrode means in addition electrically cooperating with the electrode means of the adjoining pipe section and positioned in a space that communicates with the drilling fluid when said pipe sections are fully interconnected; and, an amplifier means wherein at least one amplifier is disposed in circuit with said electrical conductor and said electrode means.

2. A pipe section according to claim 1, wherein the electrode means are situated such that the electrode means of adjoining identical pipe sections face each other with a gap therebetween in the interconnected position of these sections.

3. A pipe section according to claim 2, wherein the gap is less than 10 millimeters.

4. A pipe section according to claim 1, wherein the electrode means are situated such that the electrode means of adjoining identical pipe sections are arranged in side-by-side relationship without contacting each other.

5. A pipe section according to any one of the claims 1-4, wherein at least one of the electrode means is of annular shape.

6. A pipe section according to any one of the claims 1-4, wherein the amplifier is arranged near the electrode means at one end of the pipe section.

7. A pipe section according to claim 6, wherein the amplifier and the electrode means are embedded in a body of insulating material.

* * * * *